(12) United States Patent
Suzuki et al.

(10) Patent No.: US 12,246,389 B2
(45) Date of Patent: Mar. 11, 2025

(54) STEEL JOINED BODY AND METHOD FOR MANUFACTURING THE SAME

(71) Applicant: Neturen Co., Ltd., Tokyo (JP)

(72) Inventors: Takuya Suzuki, Tokyo (JP); Masahiro Tsukahara, Tokyo (JP); Osamu Idohara, Tokyo (JP); Setsuo Takaki, Tokyo (JP)

(73) Assignee: Neturen Co., Ltd., Tokyo (JP)

( * ) Notice: Subject to any disclaimer, the term of this patent is extended or adjusted under 35 U.S.C. 154(b) by 0 days.

(21) Appl. No.: 18/439,323

(22) Filed: Feb. 12, 2024

(65) Prior Publication Data

US 2024/0181557 A1 Jun. 6, 2024

Related U.S. Application Data

(63) Continuation of application No. 17/903,168, filed on Sep. 6, 2022, now Pat. No. 12,011,775.

(30) Foreign Application Priority Data

Sep. 8, 2021 (JP) .................................. 2021-146207
Sep. 8, 2021 (JP) .................................. 2021-146208
May 12, 2022 (JP) .................................. 2022-078948

(51) Int. Cl.
*B23K 20/00* (2006.01)
*B23K 20/02* (2006.01)
(Continued)

(52) U.S. Cl.
CPC ............ *B23K 20/026* (2013.01); *B23K 20/00* (2013.01); *B23K 20/22* (2013.01); *B23K 2103/04* (2018.08)

(58) Field of Classification Search
CPC .. B23K 2103/16; B23K 2101/18; B23K 11/11
See application file for complete search history.

(56) References Cited

U.S. PATENT DOCUMENTS 2,160,559 A * 5/1939 Orr, Jr. ................... B23K 20/04
30/346.54
12,011,775 B2 * 6/2024 Suzuki ................... B23K 20/24
(Continued)

FOREIGN PATENT DOCUMENTS

JP 6-7970 A 1/1994
JP 2008-279479 A 11/2008

*Primary Examiner* — Erin B Saad
(74) *Attorney, Agent, or Firm* — RANKIN, HILL & CLARK LLP

(57) ABSTRACT

A method for manufacturing a steel joined body having a plurality of steels joined together, the method comprising: disposing a carbonaceous material on at least one joining surface of steels to be joined together; overlapping joining surfaces of the steels to be joined together having the carbonaceous material interposed between the joining surfaces; and heating the steels having the joining surfaces overlapped at a maximum temperature of 1150° C. or higher and 1500° C. or lower, the carbonaceous material being disposed to generate a liquid phase on the joining surfaces at the maximum temperature, the carbon concentration in a joint interface after high frequency induction heating was adjusted to 0.20 mass % or higher and 2.10 mass % or lower by controlling a heating and holding time at the maximum temperature.

2 Claims, 14 Drawing Sheets

(51) Int. Cl.
*B23K 20/22* (2006.01)
*B23K 103/04* (2006.01)

(56) References Cited

U.S. PATENT DOCUMENTS

| | | | |
|---|---|---|---|
| 2006/0134395 A1* | 6/2006 | Sigler | B32B 15/16 |
| | | | 428/521 |
| 2007/0295704 A1* | 12/2007 | Sigler | B32B 15/18 |
| | | | 219/146.22 |
| 2017/0080523 A1* | 3/2017 | Andersson | B23K 9/173 |
| 2020/0023457 A1* | 1/2020 | Oki | B23K 11/0026 |
| 2020/0376587 A1* | 12/2020 | Oki | B23K 31/125 |

\* cited by examiner

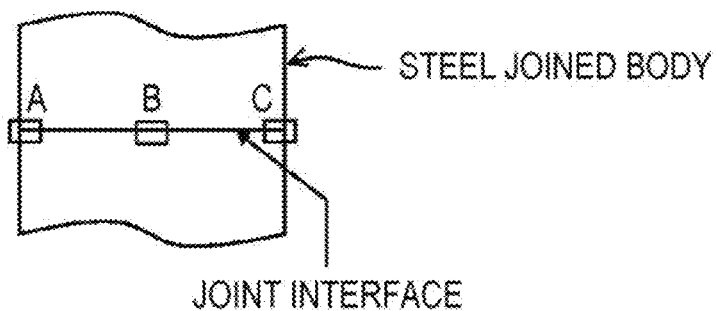

| | OBSERVED PARTS | | |
|---|---|---|---|
| | A | B | C |
| EXAMPLE 9 | | | |
| EXAMPLE 10 | | | |
| EXAMPLE 11 | | | |

200μm

STEEL JOINED BODY AND METHOD FOR MANUFACTURING THE SAME

BACKGROUND

Technical Field

The present disclosure relates to a steel joined body and a method for manufacturing the same.

Related Art

In the related art, for example, JP-A-6-7970 discloses a method for hot joining steels to address the challenge of developing a technique for easily and efficiently joining hot steels in an actual factory and for obtaining a joint strength that is high but causes no problem in the subsequent step, rolling. In the method, a carbonaceous material is applied to or scattered on joining surfaces of the hot steels, and the hot steels are overlapped or abutted on one another, followed by heating and pressing the steels in a reducing atmosphere.

SUMMARY

However, a steel joined body obtained by the technique disclosed in JP-A-6-7970 does not necessarily enhance the joint strength between the steels in an efficient manner. An object of the present disclosure is to provide a steel joined body capable of efficiently enhancing the joint strength between steels and enhancing the wear resistance of the outer periphery of a joint. Another object of the present disclosure is to provide a method for manufacturing a steel joined body capable of efficiently enhancing the joint strength between steels.

A steel joined body according to an embodiment of the invention includes a plurality of steels joined together, the plurality of steels including a joint interface having a carbon concentration of 0.20 mass % or more and 2.10 mass % or less, and the steel joined body including a concentration gradient layer having a carbon concentration decreasing with distance from the joint interface.

A steel joined body according to an embodiment of the invention includes a plurality of steels or medium-carbon steels joined together, the plurality of steels including a joint interface having a carbon concentration of 0.50 mass % or more and 2.10 mass % or less, and the steel joined body including a concentration gradient layer having a carbon concentration decreasing with distance from the joint interface.

A method for manufacturing a steel joined body according to an embodiment of the invention is a method for manufacturing a steel joined body having a plurality of steels joined together, and the method involves: disposing a carbonaceous material on at least one joining surface of steels to be joined together; overlapping joining surfaces of the steels to be joined together having the carbonaceous material interposed between the joining surfaces; and heating the steels having the joining surfaces overlapped at a maximum temperature of 1150° C. or higher and 1500° C. or lower, the carbonaceous material being disposed to generate a liquid phase on the joining surfaces at the maximum temperature.

The method for manufacturing a steel joined body according to an embodiment of the invention is a method for manufacturing a steel joined body having a plurality of steels joined together, and the method involves: disposing a carbonaceous material on at least one joining surface of steels to be joined together; overlapping joining surfaces of the steels to be joined together having the carbonaceous material interposed between the joining surfaces by pressing the joining surfaces against each other by self-weight or by applying a pressing load; heating the steels having the joining surfaces overlapped at a maximum temperature at which a liquid phase of the carbonaceous material is generated; and cooling the heated steels.

According to an embodiment of the invention, it is possible to provide a steel joined body capable of efficiently enhancing the joint strength between steels and enhancing the wear resistance of the outer periphery of a joint. In addition, according to an embodiment of the invention, it is possible to provide a method for manufacturing a steel joined body capable of efficiently enhancing the joint strength between steels.

BRIEF DESCRIPTION OF THE DRAWINGS

FIGS. 14A and 14B show a view for describing parts to observe metallographic structures of steel joined bodies obtained in Example 7 and Example 8 and photographs of the metallographic structures of the parts.

DETAILED DESCRIPTION

Hereinafter, embodiments of the invention will be described with reference to the drawings.

Embodiment of Steel Joined Body

Figure 1:
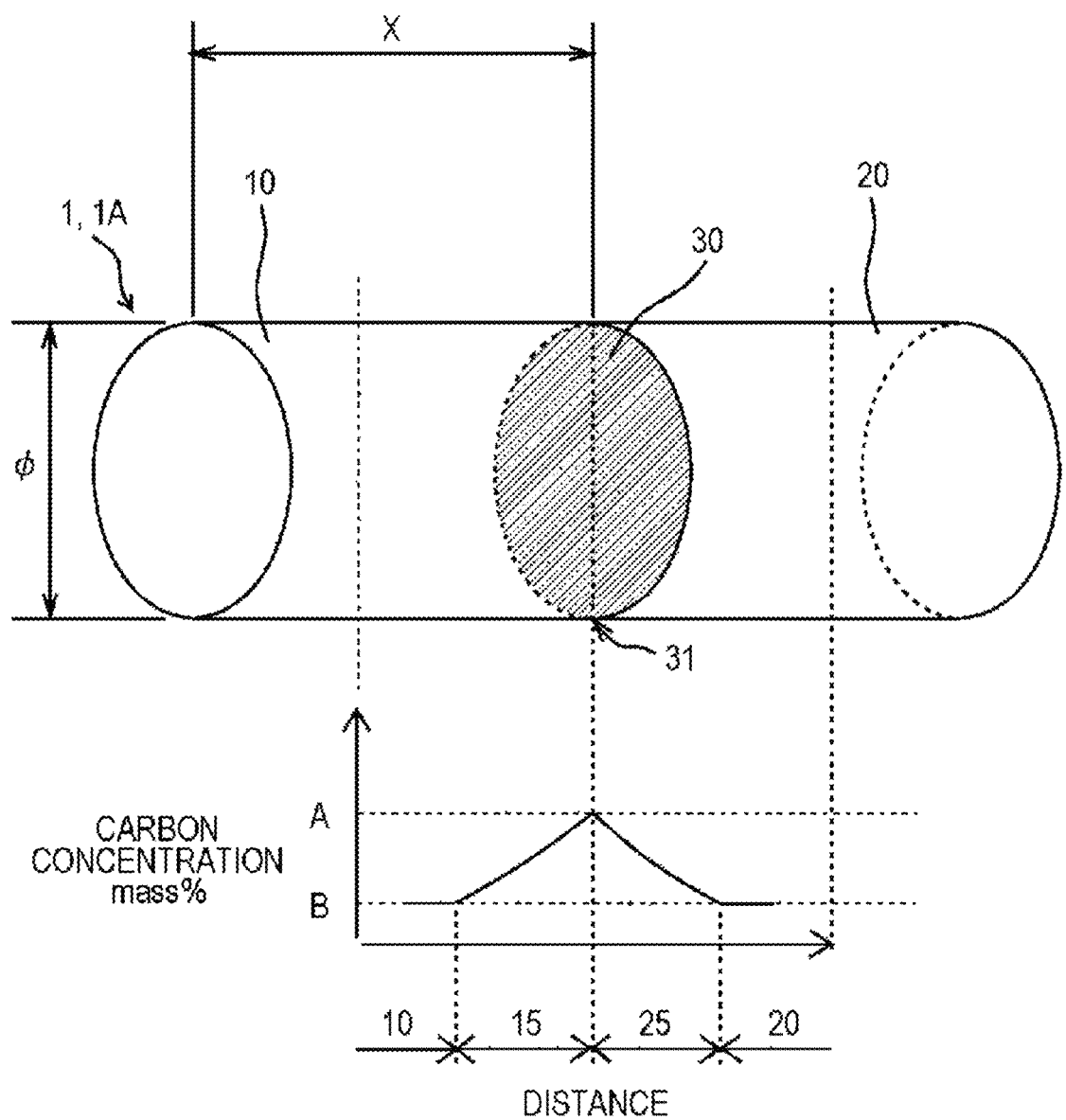
FIG. 1 is a conceptual diagram for describing a steel joined body according to an embodiment of the invention.

FIG. 1 is a conceptual diagram for describing a steel joined body according to this embodiment.

In a steel joined body 1 according to this embodiment, a plurality of steels 10 and 20 is joined together as shown in FIG. 1. A joint interface 30a (hatched area in FIG. 1) where the plurality of steels 10 and 20 (hereinafter also referred to as "materials") is joined together has a carbon concentration (carbon concentration A shown in FIG. 1) of 0.20 mass % or more and 2.10 mass % or less. Furthermore, the steel joined body 1 includes concentration gradient layers 15 and 25 having a carbon concentration decreasing with distance from the joint interface 30a.

The steel joined body 1 according to this embodiment includes the joint interface 30a having a carbon concentration of 0.20 mass % or more and 2.10 mass % or less, which makes it possible to enhance the joint strength between the steels 10 and 20 efficiently and makes it possible to enhance the wear resistance of the outer periphery of a joint 31 (an area where the concentration gradient layers 15 and 25 are formed).

Specifically, the joint interface 30a having a carbon concentration of 2.10 mass % or less suppresses crystallization of a solidification structure at the joint interface 30a. Since it is possible to suppress crystallization of a hard and brittle solidification structure at the joint interface 30a, the joint strength between the steels 10 and 20 is enhanced efficiently. In addition, the joint interface 30a having a carbon concentration of 0.20 mass % or more enhances the hardness of the joint interface 30a. Accordingly, the wear resistance of the outer periphery of the joint 31 is also enhanced.

The carbon concentration is preferably 0.20 mass % or more and 0.90 mass % or less. The joint interface 30a having a carbon concentration of 0.20 mass % or more and 0.90 mass % or less enhances the joint strength between the steels 10 and 20 more efficiently.

Specifically, the joint interface 30a having a carbon concentration of 0.90 mass % or less suppresses precipitation of cementite at austenite grain boundaries. Since it is possible to suppress precipitation of cementite at hard and brittle austenite grain boundaries in the joint interface 30a, the joint strength between the steels 10 and 20 is enhanced more efficiently.

To measure the carbon concentration in the joint interface 30a of the steel joined body 1 according to this embodiment, the steel joined body 1 is cut along the joint interface 30a, and the cross section is polished, thereby measuring the carbon concentration with a device for measuring elemental distribution such as an electron probe microanalyzer (EPMA) or energy dispersive X-ray spectrometer (EDX). Herein, a numerical value of the carbon concentration in the joint interface 30a is obtained by measuring any five parts of the polished cross section and calculating the average of those parts.

Furthermore, the steel joined body 1 according to this embodiment includes the concentration gradient layers 15 and 25 having a carbon concentration decreasing with distance from the joint interface 30a. Due to a high carbon concentration in the joint interface 30a (see the carbon concentration A shown in FIG. 1), the joint strength between the steels 10 and 20 is enhanced efficiently. In addition, since the carbon concentrations in the concentration gradient layers 15 and 25 (the carbon concentration B in FIG. 1) on the opposite side of the joint interface 30a (on the side closer to the steels (materials) 10 and 20) before joining) is lower than that of the joint interface 30a, "elongation" occurs on the side closer to the materials 10 and 20. For this reason, the steel joined body 1 according to this embodiment is preferable for uses that demand "elongation" on the side closer to the materials 10 and 20.

As shown in FIG. 1, it is preferable that the concentration gradient layers 15 and 25 have a carbon concentration continuously decreasing with distance from the joint interface 30a.

The expression "continuously decreasing" used herein indicates that the numerical value of the carbon concentration proportionally decreases from the joint interface 30a toward the plurality of steels (materials) 10 and 20 as shown in FIG. 1.

Due to the concentration gradient layers 15 and 25 having such a decreasing tendency, not only the above effect is achieved but also ductility and toughness at the joint interface 30a are enhanced.

To measure the carbon concentrations in the concentration gradient layers 15 and 25 in the steel joined body 1 according to this embodiment, the steel joined body 1 is cut along the joint interface 30a, and then, portions of the steel joined body 1 away from the cut joint interface 30a (portions on the side closer to the materials 10 and 20) are cut, followed by polishing the cut cross sections, thereby measuring the carbon concentrations with a device for measuring elemental distribution such as an electron probe microanalyzer (EPMA) or energy dispersive X-ray spectrometer (EDX).

Herein, the decreasing tendency of the concentration gradient layers 15 and 25 is measured in the following manner. That is, any 5 parts on each concentration gradient layer (10 parts in total) are chosen along a straight line in directions from the joint interface 30a toward the materials 10 and 20, that is, along a straight line including a part having the carbon concentration of the joint interface 30a and parts having the carbon concentrations of the materials 10 and 20, and carbon concentrations of those parts are measured with a device for measuring elemental distribution as recited above, followed by plotting each carbon concentration relative to the distance to make a graph as shown in FIG. 1 where the distance from the joint interface 30a is taken along the abscissa and the carbon concentration is taken along the ordinate.

The steel joined body 1 according to this embodiment does not depend on the structure of the joint interface 30a, but the joint interface 30a preferably includes pearlite. Pearlite is obtained by air-cooling or slowly cooling the steel joined body 1 in the austenite state. The joint interface 30a including pearlite enhances the tensile strength and the bending strength, which enhances the joint strength of the joint interface 30a more efficiently. Note that the structure of the joint interface 30a is observed in the following manner. That is, the steel joined body 1 is cut along the joint interface 30a, and the cut cross section is polished, thereby observing the polished cross section with an optical microscope while the cross section is subjected to initial etching.

It is preferable that the joint interface 30a does not include cementite at the austenite grain boundaries. Grain boundary cementite carries a potential to generate cracks starting from the grain boundary cementite when being pulled or bent.

Note that the expression "does not include" does not indicate that grain boundary cementite is not included at all but indicates that the proportion of grain boundary cementite at the joint interface 30a is less than 10%. The proportion of grain boundary cementite at the joint interface 30a is determined by performing initial etching on the cross section, followed by performing the point counting method according to JIS G0555.

In the steel joined body 1 according to this embodiment, the steels (materials) 10 and 20 to be joined are not particularly limited in raw material and may be any kinds of steels as long as they are combinable metals. In addition, alloy elements other than carbon included in the joint interface 30a and the plurality of steels (materials) 10 and 20 before joining are not particularly limited. For example, as defined in JIS G 4051, the joint interface 30a and the plurality of steels (materials) 10 and 20 before joining typically include 1.50 mass % or less of Si and 1.00 mass % or less of Mn, and the rest of the compositions are Fe and unavoidable impurities. The plurality of steels (materials) 10 and 20 before joining is not particularly limited in shape as long as each material has a joining surface and the joining surfaces can be overlapped in an integrated manner.

The steels (materials) 10 and 20 may employ shapes of, for example, a cylinder, a prism, and a screw or a shape with recessions and protrusions.

In another steel joined body 1A according to this embodiment, a plurality of steels 10 and 20, or medium-carbon steels, is joined together as shown in FIG. 1. In addition, a joint interface 30a (hatched area in FIG. 1) where the plurality of steels 10 and 20, or medium-carbon steels, is joined together has a carbon concentration (carbon concentration A shown in FIG. 1) of 0.50 mass % or more and 2.10 mass % or less. Furthermore, the steel joined body 1A includes concentration gradient layers 15 and 25 having a carbon concentration decreasing with distance from the joint interface 30a.

In other words, the steel joined body 1A has a carbon concentration different from that of the steel joined body 1.

As described above, when a medium-carbon steel is employed as the plurality of steels (materials) before joining, setting the carbon concentration to 0.50 mass % or more and 2.10 mass % or less gives an advantage for achieving the object of the present disclosure. Specifically, the joint interface 30a having a carbon concentration of 2.10 mass % or less suppresses crystallization of a solidification structure at the joint interface 30a. Since it is possible to suppress crystallization of a hard and brittle solidification structure at the joint interface 30a, the joint strength between the steels 10 and 20 is enhanced efficiently.

In addition, the joint interface 30a having a carbon concentration of 0.50 mass % or more enhances the hardness of the joint interface 30a. Accordingly, the wear resistance of the periphery of the joint 31 is enhanced.

Furthermore, the steel joined body 1A according to this embodiment preferably has a carbon concentration of 0.50 mass % or more and 0.90 mass % or less. The joint interface 30a having a carbon concentration of 0.50 mass % or more and 0.90 mass % or less enhances the joint strength between the steels 10 and 20 more efficiently.

Specifically, the joint interface 30a having a carbon concentration of 0.90 mass % or less suppresses precipitation of cementite at austenite grain boundaries. Since it is possible to suppress precipitation of cementite at hard and brittle austenite grain boundaries in the joint interface 30a, the joint strength between the steels 10 and 20 is enhanced more efficiently.

Furthermore, the steel joined body 1A according to this embodiment includes the concentration gradient layers 15 and 25 having a carbon concentration decreasing with distance from the joint interface 30a. Due to a high carbon concentration in the joint interface 30a (see the carbon concentration A shown in FIG. 1), the joint strength between the steels 10 and 20 is enhanced efficiently. In addition, since the carbon concentrations in the concentration gradient layers 15 and 25 (the carbon concentration B in FIG. 1) on the opposite side of the joint interface 30a (on the side closer to the steels (materials) 10 and 20) before joining) is lower than that of the joint interface 30a, "elongation" occurs on the side closer to the materials 10 and 20. For this reason, the steel joined body 1A according to this embodiment is preferable for uses that demand "elongation" on the side closer to the materials 10 and 20.

Even in the steel joined body 1A according to this embodiment, it is preferable that the concentration gradient layers 15 and 25 have a carbon concentration continuously decreasing with distance from the joint interface 30a as shown in FIG. 1.

Due to the concentration gradient layers 15 and 25 having such a decreasing tendency, not only the above effect is achieved but also ductility and toughness at the joint interface 30a are enhanced.

Note that the measurement of the carbon concentrations in the joint interface 30a and the concentration gradient layers 15 and 25 may employ the conditions and method employed in the measurement of the steel joined body 1 according to this embodiment.

The medium-carbon steel herein refers to a steel having a carbon concentration of 0.30 mass % or more and 0.50 mass % or less. For reference, a low-carbon steel refers to a steel having a carbon concentration of less than 0.30 mass %, and a high-carbon steel refers to a steel having a carbon concentration of more than 0.50 mass %. Since the joint interface 30a of the steel joined body 1A according to this embodiment has a metallographic structure similar to that of the steel joined body 1 according to this embodiment, the following description will omit the metallographic structure.

With reference to the drawings, hereinafter described is a mechanism for increasing the joining force between the steels in the steel joined bodies 1 and 1A according to this embodiment.

Figure 2:
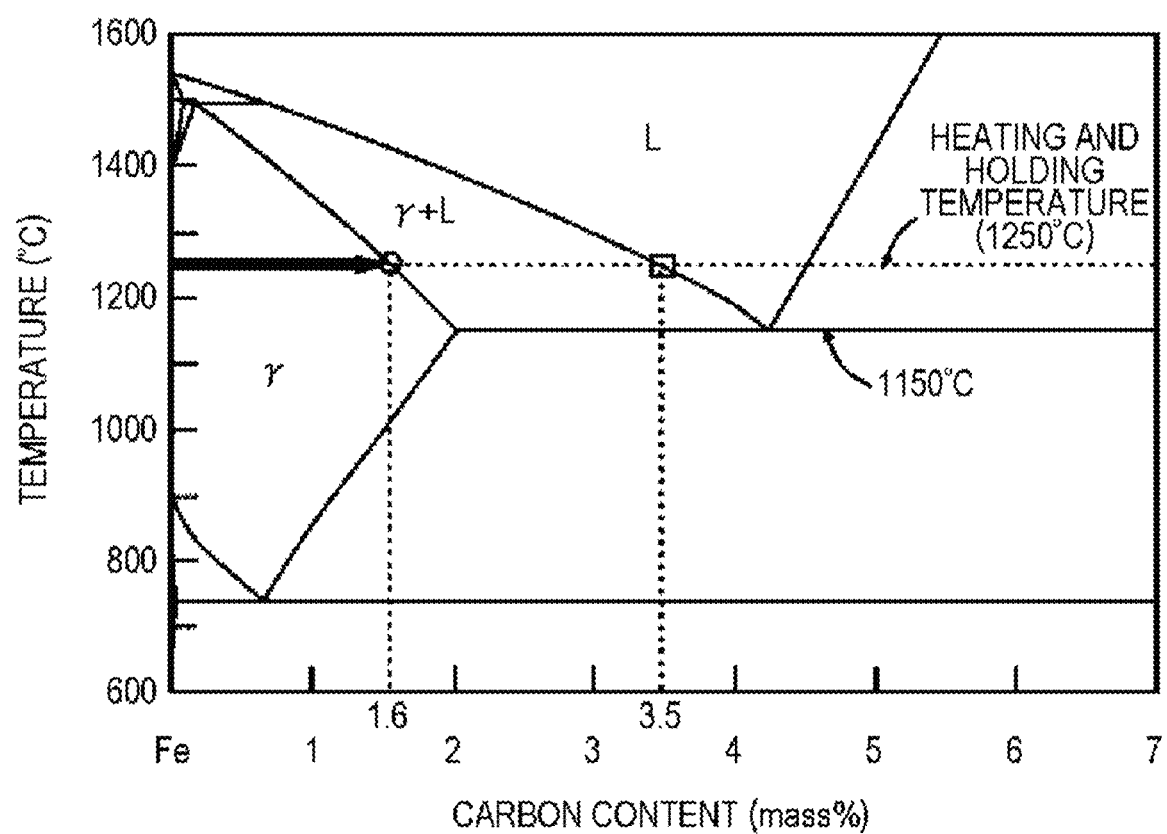
FIG. 2 is a phase diagram of an iron-cementite system for describing the effect of the present disclosure.
Figure 3A:
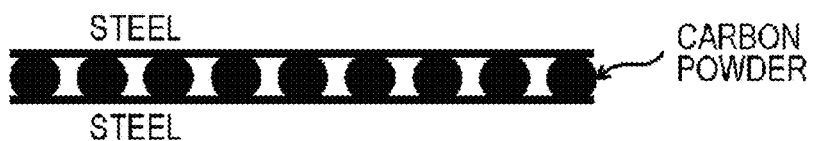
FIGS. 3A to 3D are conceptual diagrams for describing the effect of the present disclosure.
Figure 3B:
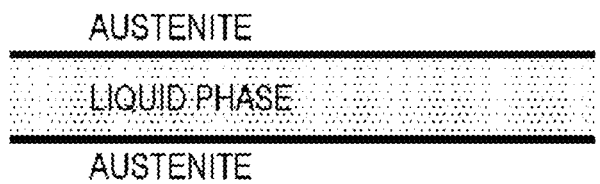
Figure 3C:
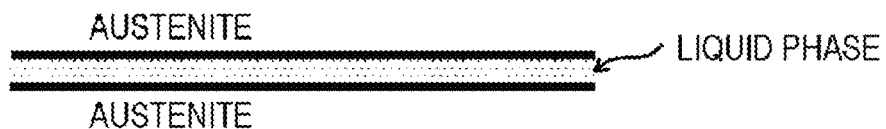
Figure 3D:
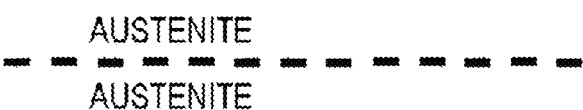

FIG. 2 is a phase diagram of an iron-cementite system for describing the effect of the present disclosure. FIGS. 3A to 3D are conceptual diagrams for describing the effect of the present disclosure, specifically, a reaction occurring at a joint interface. As a method for manufacturing the steel joined bodies 1 and 1A according to this embodiment, carbon powder (carbonaceous material) is disposed on at least one joining surface between steels to be joined, followed by overlapping the joining surfaces of the steels to be joined having the carbonaceous material interposed therebetween, thereby heating the steels in a predetermined atmosphere (for example, in the air) at a maximum temperature of 1150° C. or higher and 1500° C. or lower (preferably 1150° C. or higher and 1300° C. or lower) (see FIG. 3A).

When the temperature of the joining surfaces between the steels reaches, for example, 1250° C., a liquid phase L having a carbon concentration of 3.5 mass % is generated at the interface between the steels and the carbonaceous material (see the part denoted by □ in FIG. 2). The liquid phase L increases until the carbonaceous material disappears (see FIG. 3B).

At 1250° C., the interface between an "austenite phase γ" region and an "austenite phase γ+liquid phase L" region (see the part denoted by ○ in FIG. 2) has a carbon concentration of 1.6 mass % (see FIG. 2). Carbon diffuses very fast at 1250° C. When this temperature is held, carbon diffuses into the internal austenite phase γ at a high rate from the joining surfaces of the steels. Accordingly, at the interface between the liquid phase L and the austenite y, the austenite phase γ deprives carbon from the liquid phase L in order to maintain the carbon concentration at 1.6 mass %. On the other hand, the liquid phase L decreases in order to maintain the carbon concentration at 3.5 mass % (see FIG. 3C). Eventually, the liquid phase L disappears, thereby completing joining of the steels (see FIG. 3D).

Immediately after the liquid phase L disappears, the carbon concentration of the joining surfaces may be high. In addition, in order to suppress precipitation of grain boundary cementite, it is necessary to reduce the carbon concentration in the joint interface to 0.20 mass % or more and 0.90 mass % or less in the steel joined body 1. With regard to the steel joined body 1A, it is necessary to reduce the carbon concentration to 0.50 mass % or more and 0.90 mass % or less. The decrease in carbon concentration in the joint interface is controlled by increasing a heating and holding time at the above maximum temperature.

Note that the carbonaceous material herein is not particularly limited in raw material and shape as long as the carbonaceous material is disposed on at least one joining surface of the steels to be joined and enables integration of the joining surfaces. An example of the carbonaceous material includes powder (carbon powder) of graphite particles having an average particle size of 1 μm.

Embodiment of Method for Manufacturing Steel Joined Body

Figure 6:
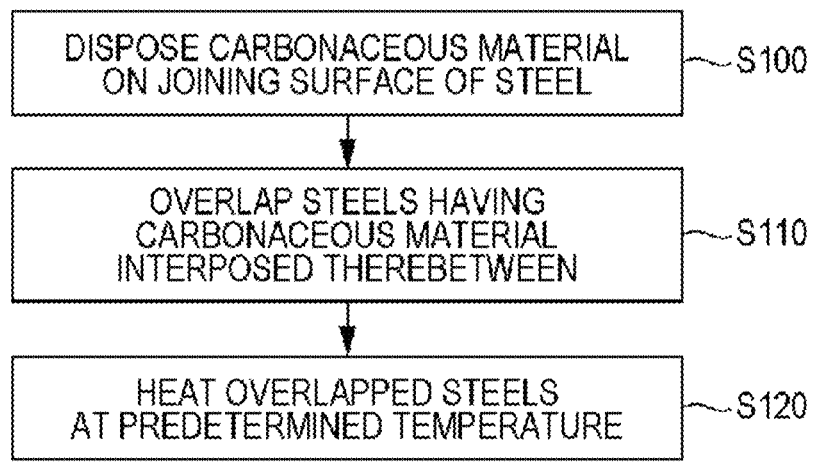
FIG. 6 is a process flowchart for describing a method for manufacturing a steel joined body according to an embodiment of the invention.

FIG. 6 is a process flowchart for describing a method for manufacturing a steel joined body according to an embodiment of the invention.

As shown in FIG. 6, the method for manufacturing a steel joined body according to this embodiment is a method for manufacturing a steel joined body having a plurality of steels joined together, the method involving: disposing a carbonaceous material on at least one joining surface of steels to be joined together (Step S100 shown in FIG. 6); overlapping the joining surfaces of the steels to be joined together having the carbonaceous material interposed therebetween (Step S110 shown in FIG. 6); and heating the steels having the joining surfaces overlapped at a maximum temperature of 1150° C. or higher and 1500° C. or lower (Step S120 shown in FIG. 6).

Furthermore, in the disposing (Step S100) in the method for manufacturing a steel joined body according to this embodiment, the carbonaceous material is disposed to generate a liquid phase on the joining surfaces at the above maximum temperature.

Involving the above steps, the method for manufacturing a steel joined body according to an embodiment of the invention efficiently enhances the joint strength between the steels.

Figure 7:
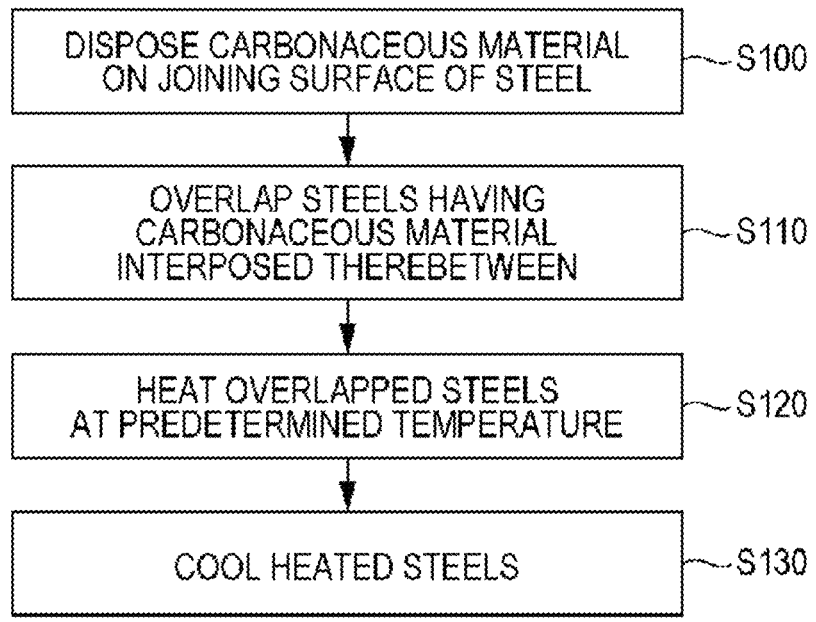
FIG. 7 is a process flowchart for specifically describing the method for manufacturing a steel joined body according to the embodiment of the invention shown in FIG. 6.

FIG. 7 is a process flowchart for specifically describing the method for manufacturing a steel joined body according to this embodiment of the invention shown in FIG. 6.

As shown in FIG. 7, the method for manufacturing a steel joined body according to this embodiment is a method for manufacturing a steel joined body having a plurality of steels joined together, the method involving: disposing a carbonaceous material on at least one joining surface of steels to be joined together (Step S100 shown in FIG. 7); overlapping the joining surfaces of the steels to be joined together having the carbonaceous material interposed therebetween by pressing the joining surfaces against each other by self-weight or by applying a pressing load (Step S110 shown in FIG. 7); heating the steels having the joining surfaces overlapped at a maximum temperature at which a liquid phase of the carbonaceous material is generated (Step S120 shown in FIG. 7); and cooling the heated steels (Step S130 shown in FIG. 7).

Involving the above steps, the method for manufacturing a steel joined body according to an embodiment of the invention makes it possible to easily and efficiently enhance the joint strength between the steels.

Each of these steps will be described in detail below.

FIGS. 8A to 8D are conceptual diagrams for describing a method for manufacturing a steel joined body according to a specific first embodiment of the invention. FIGS. 9A to 9D are conceptual diagrams for describing a method for manufacturing a steel joined body according to a specific second embodiment of the invention. The first embodiment shown in FIGS. 8A to 8D is similar to the second embodiment shown in FIGS. 9A to 9D except for the form of a carbonaceous material disposed on joining surfaces of steels.

<Disposing (Step S100)>

Figure 8A:
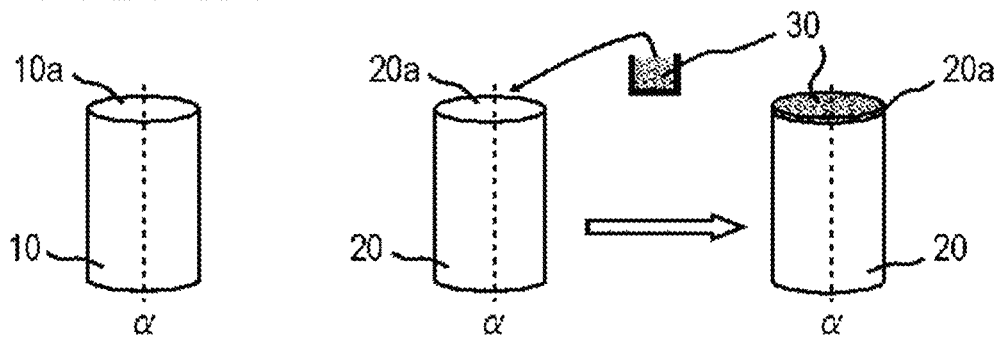
FIGS. 8A to 8D are conceptual diagrams for describing a method for manufacturing a steel joined body according to a specific first embodiment of the invention.
Figure 9A:
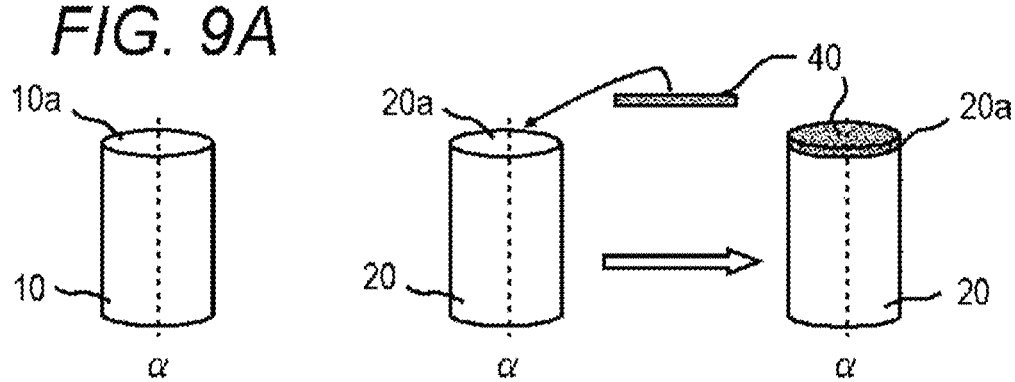
FIGS. 9A to 9D are conceptual diagrams for describing a method for manufacturing a steel joined body according to a specific second embodiment of the invention.

In disposing (Step S100) in the methods for manufacturing the steel joined body 1 according to the first and second embodiments, as shown in FIGS. 8A and 9A, a carbonaceous material (30 or 40) is disposed on at least one joining surface (10a and/or 20a, one joining surface in FIGS. 8A and 9A)) of steels (10 and 20) to be joined together. At this time, the carbonaceous material is disposed to generate a liquid phase L (see FIG. 10, to be described) on the joining surfaces (10a and 20a) at a maximum temperature during heating (Step S120) to be described.

The disposing in this manner enhances the joint strength between the steels more efficiently.

Herein, the steels (materials) 10 and 20 to be joined are not particularly limited in raw material and may be any kinds of steels as long as they are combinable metals. For example, a low-carbon steel, a medium-carbon steel, and a high-carbon steel may be used.

The medium-carbon steel herein refers to a steel having a carbon concentration of 0.30 mass % or more and 0.50 mass % or less. For reference, a low-carbon steel refers to a steel having a carbon concentration of less than 0.30 mass %, and a high-carbon steel refers to a steel having a carbon concentration of more than 0.50 mass %. When a low-carbon steel, a medium-carbon steel, and a high-carbon steel are employed, alloy elements other than carbon are not particularly limited. For example, as defined in JIS G 4051, 1.5 mass % or less of Si and 1.0 mass % or less of Mn may be contained, and the rest of the compositions may be Fe and unavoidable impurities.

The steels (10 and 20) are not particularly limited in shape as long as each steel has a joining surface (10a or 20a) and the joining surfaces (10a and 20a) can be overlapped in an integrated manner. The steels (10 and 20) may employ shapes of, for example, a cylinder, a prism, and a screw or a shape with recessions and protrusions.

In addition, the carbonaceous material (30 and 40) is not particularly limited in raw material and shape as long as the carbonaceous material is disposed on at least one joining surface (10a and/or 20a) of the steels (10 and 20) to be joined and enables integration of the joining surfaces (10a and 20a). For example, it is possible to employ a powdery carbonaceous material (30) shown in FIGS. 8A and 8B or a sheet-like carbonaceous material (40) shown in FIGS. 9A and 9B. When employing the powdery carbonaceous material (30), the carbonaceous material is disposed by being applied to the joining surface (10a and/or 20a). When employing the sheet-like carbonaceous material (40), the carbonaceous material is directly disposed on the joining surface (10a and/or 20a).

<Overlapping (Step S110)>

Figure 8B:
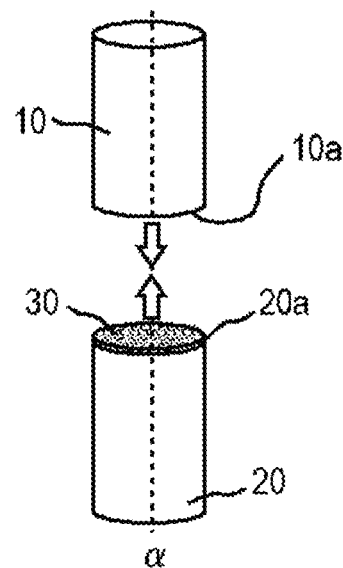
Figure 9B:
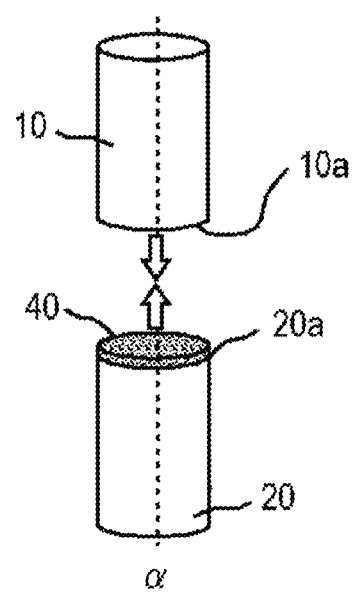

In overlapping (Step S110) in the methods for manufacturing the steel joined body 1 according to the first and second embodiments, as shown in FIGS. 8B and 9B, the joining surfaces (10a and 20a) of the steels (10 and 20) to be joined are overlapped having the carbonaceous material (30 or 40) disposed in the "disposing (Step S100)" interposed therebetween. In the overlapping (Step S110), when the joining surfaces (10a and 20a) of the steels (10 and 20) are overlapped, it is preferable to apply a load to fix the joining surfaces. In the overlapping of this embodiment, it is possible to enhance the joining force between the steels (10 and 20) by applying a load to fix the joining surfaces (10a and 20a) of the steels (10 and 20).

More specifically, in the overlapping (Step S110) in the methods for manufacturing the steel joined body 1 according to the first and second embodiments, as shown in FIGS. 8B and 9B, the steels (10 and 20) to be joined are overlapped having the carbonaceous material (30 or 40) disposed in the "disposing (Step S100)" interposed therebetween while the joining surfaces (10a and 20a) of the steels (10 and 20) are pressed against each other.

In the overlapping (Step S110), when the joining surfaces (10a and 20a) of the steels (10 and 20) are overlapped while the joining surfaces are pressed against each other, it is preferable to fix the joining surfaces by self-weight. In the overlapping of this embodiment, fixing the joining surfaces (10a and 20a) of the steels (10 and 20) by self-weight in this manner increases the joint force between the steels (10 and 20).

Alternatively, in the overlapping (Step S110), when the joining surfaces (10a and 20a) of the steels (10 and 20) are overlapped while the joining surfaces are pressed against each other, it is preferable to apply a load (pressing load) to fix the joining surfaces. In the overlapping of this embodiment, it is possible to enhance the joining force between the steels (10 and 20) by applying a load to fix the joining surfaces (10a and 20a) of the steels (10 and 20). Furthermore, the applying of a pressing load is preferable because the process enables overlapping of the joining surfaces (10a and 20a) of the steels (10 and 20) not only in the vertical direction as shown in FIGS. 8A to 8D and 9A to 9D but also in the horizontal direction (not shown).

Still further, in the overlapping of this embodiment, it is preferable to adjust inclination of the joining surfaces of the steels to be joined during the pressing. The adjustment of inclination of the joining surfaces enhances the joint strength between the steels more efficiently.

<Heating (Step S120)>

Figure 8C:
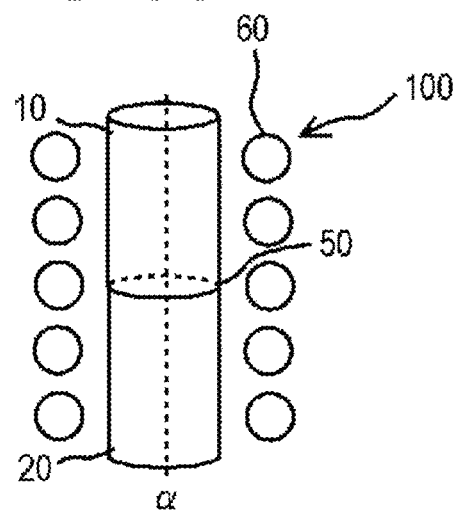
Figure 9C:
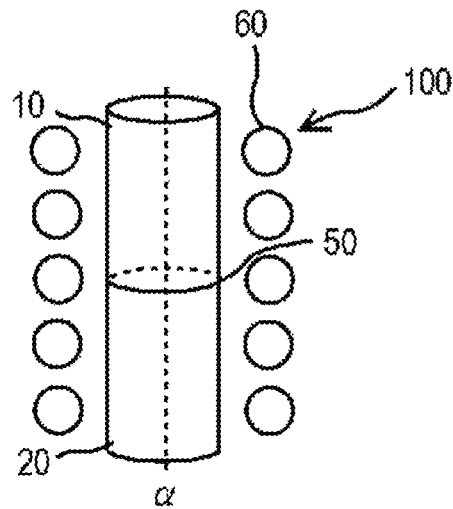

In heating (Step S120) in the methods for manufacturing the steel joined body 1 according to the first and second embodiments, as shown in FIGS. 8C and 9C, the steels (10 and 20) having the joining surfaces (10a and 20a) overlapped in the "overlapping (Step S110)" are heated. Herein, the maximum temperature for heating the steels (10 and 20) is set within a range in which the liquid phase L is generated at a joining surface 50 (see FIG. 10, to be described).

More specifically, in the heating (Step S120) in the methods for manufacturing the steel joined body 1 according to the first and second embodiments, as shown in FIGS. 8C and 9C, the joining surfaces (10a and 20a) are heated while being fixed by self-weight by pressing the steels (10 and 20) having the joining surfaces overlapped in the "overlapping (Step S110)". Herein, the maximum temperature for heating the steels (10 and 20) is set within a range in which the liquid phase L is generated at a joining surface 50 (see FIG. 10, to be described).

In addition, in the heating, it is preferable to heat the steels (10 and 20) while applying a load (pressing load) to fix the joining surfaces by pressing the steels (10 and 20) having the joining surfaces (10a and 20a) overlapped.

In this manner, heating the steels (10 and 20) while applying a load to fix the steels (10 and 20) with the joining surfaces (10a and 20a) overlapped makes it possible to enhance the joint force between the steels (10 and 20). Furthermore, the applying of a pressing load is preferable because the process enables heating of the joining surfaces (10a and 20a) of the steels (10 and 20) not only in the vertical direction as shown in FIGS. 8A to 8D and 9A to 9D but also in the horizontal direction (not shown).

As described above, in the disposing (Step S100), the carbonaceous material is disposed having its mass adjusted to generate the liquid phase L on the joining surface 50 at the maximum temperature during the heating (Step S120).

Since the carbonaceous material is disposed on the joining surface, the carbon concentration in the joining surface 50 increases. Accordingly, the tensile strength and the bending strength of the joining surface 50 increase, which efficiently enhances the joint strength between the joining surfaces 50 or the steels.

In the mass adjustment of the carbonaceous material to generate the liquid phase L (see FIG. 10) on the joining surface 50 at the maximum temperature during the heating of the carbonaceous material, for example, the mass of the carbonaceous material to be disposed on the joining surface 50 is changed using the steels (10 and 20) having a shape and a carbon concentration identical to those of a steel joined body or a product, and each steel is subjected to thermal joining test at the same maximum temperature to evaluate a joint ratio (to be described), thereby determining an appropriate mass of the carbonaceous material for generating the liquid phase L.

The carbonaceous material is preferably disposed such that the liquid phase is generated on the entire joining surface at the maximum temperature.

Disposing the carbonaceous material to generate the liquid phase on the entire joining surface enables joining of the entire joining surface. Accordingly, the joint strength between the steels is enhanced more efficiently.

The heating (Step S120) is not particularly limited in method unless the effect of the present disclosure is impaired and may employ various heating methods such as high frequency induction heating (100) using a known heating coil 60, furnace heating other than the high frequency induction heating, and laser heating.

An atmosphere during the heating (Step S120) is not particularly limited.

Examples of the atmosphere include an oxidizing atmosphere (such as oxygen and the air) or a non-oxidizing atmosphere (such as nitrogen and argon).

The heating (Step S120) in the present disclosure is preferably performed by high frequency induction heating (100). The high frequency induction heating (100) raises the temperature to a desired level rapidly and accurately, which enables manufacturing of the steel joined body (1).

Figure 8D:
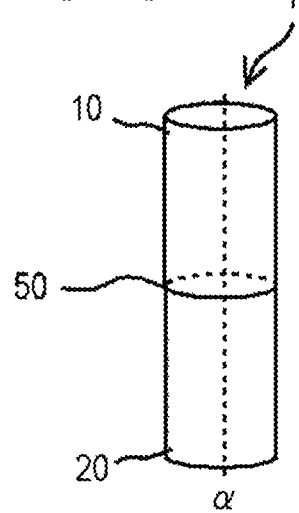
Figure 9D:
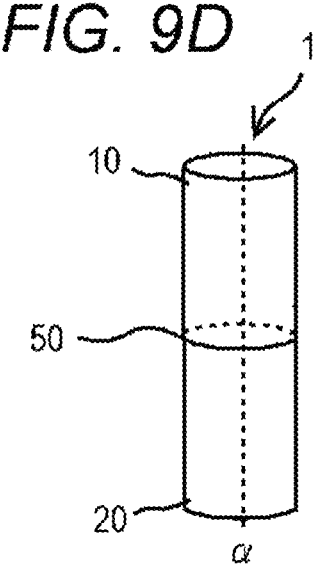

In the heating (Step S120) in the present disclosure, the steels (10 and 20) are joined together when the liquid phase L generated on the joining surface 50 of the steels (10 and 20) disappears (FIGS. 8D and 9D). The cooling after the heating (Step S120) in the present disclosure is not particularly limited in method and may employ any known method such as gas cooling and injection cooling by a quenchant such as a polymer.

More specifically, the cooling (Step S130) shown in FIG. 7 after the heating (Step S120) in the present disclosure is not particularly limited in method and may employ any known method such as standing until cool, gas cooling, and injection cooling by a quenchant such as a polymer.

Each step involved in the present disclosure has been described above. With reference to the drawings, hereinafter described is a specific example of a mechanism for enhancing the joining force between steels by performing each of the above steps.

Figure 10:
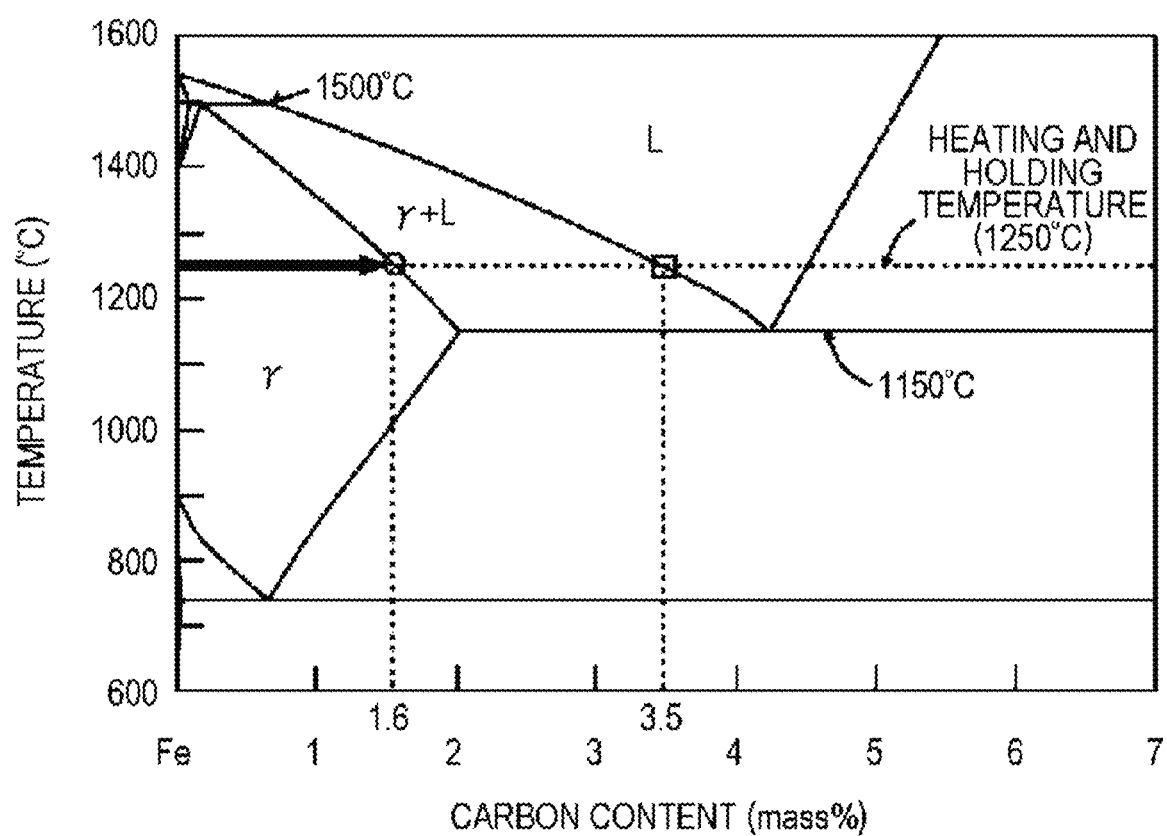
FIG. 10 is a phase diagram of an iron-cementite system for describing the effect of the present disclosure.
Figure 11A:
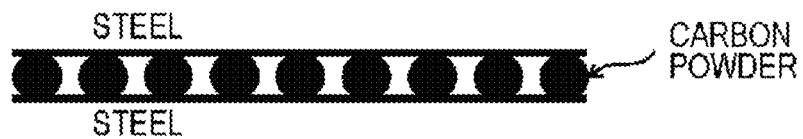
FIGS. 11A to 11D are conceptual diagrams for describing the effect of the present disclosure.
Figure 11B:
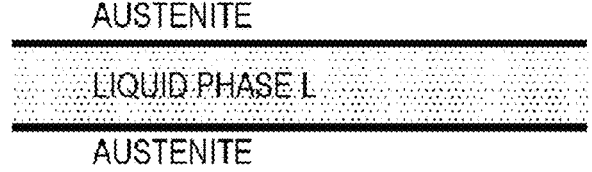
Figure 11C:
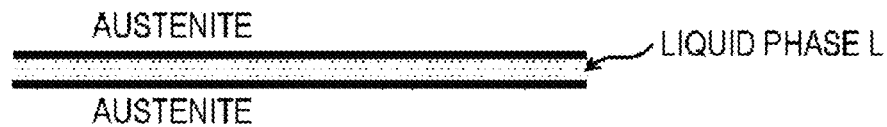
Figure 11D:
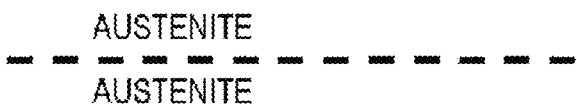

FIG. 10 is a phase diagram of an iron-cementite system for describing the effect of the present disclosure. FIG. 11 is a conceptual diagram for describing the effect of the present disclosure, specifically, a reaction occurring at a joint interface. The method for manufacturing the steel joined body 1 according to this embodiment involves: disposing carbon powder (carbonaceous material) having its mass adjusted to generate a liquid phase L on at least one joining surface of steels to be joined together at a maximum temperature of heating; and heating the steels obtained by overlapping joining surfaces of the steels to be joined having the carbonaceous material interposed therebetween in a predetermined atmosphere (for example, in the air) at a predetermined maximum temperature (see FIG. 11A).

FIG. 10 shows that the temperature at which the liquid phase L is generated at the joint interface between the steels and the carbonaceous material is 1150° C. or higher and 1500° C. or lower.

Specifically, when the maximum temperature of the surroundings of the joining surfaces between the steels reaches, for example, 1250° C., the liquid phase L having a carbon concentration of 3.5 mass % is generated at the interface between the steels and the carbonaceous material (see the part denoted by □ in FIG. 10). The liquid phase L increases until the carbonaceous material disappears (see FIG. 11B).

At 1250° C., the interface between an "austenite phase $\gamma$" region and an "austenite phase $\gamma$+liquid phase L" region (see the part denoted by ○ in FIG. 10) has a carbon concentration of 1.6 mass %. For this reason, at 1250° C., most parts of the steels enter a single austenite phase $\gamma$. With the carbon content over 1.6 mass %, note that two phases, austenite phase $\gamma$ and the liquid phase L, coexist. Carbon diffuses very fast at 1250° C. When this temperature is held, carbon diffuses into the internal austenite phase $\gamma$ at a high rate from the joining surfaces of the steels. Accordingly, at the interface between the liquid phase L and the austenite phase $\gamma$, the austenite phase $\gamma$ deprives carbon from the liquid phase L in order to maintain the carbon concentration at 1.6 mass %, while the liquid phase L decreases in order to maintain the carbon concentration at 3.5 mass % (see FIG. 11C). The liquid phase L eventually disappears, thereby completing joining of the steels (see FIG. 11D).

Although the effect of the present disclosure is described to be obtained by the heating (Step S120) at a maximum temperature of 1250° C., the phase diagram of the iron-cementite system in FIG. 10 and the following Examples show that the effect is considered to be obtained at a temperature range in which the "austenite phase $\gamma$" region and the "austenite phase $\gamma$+liquid phase L" region are formed (a maximum temperature of 1150° C. or higher and 1500° C. or lower).

As described above, the carbonaceous material is disposed having its mass adjusted to generate the liquid phase L on the joining surface, and the steels with the joining surfaces overlapped are heated at a maximum temperature of 1150° C. or higher and 1500° C. or lower, thereby performing the joining.

The maximum temperature is preferably 1150° C. or higher and 1300° C. or lower. Setting the maximum temperature to 1300° C. or lower efficiently cools heating members (coil and the like) for heating the steels and suppresses, for example, deformation of a steel joined body itself due to the heat. The maximum temperature during the heating (S120) is measured by a platinum rhodium thermocouple welded to the outer periphery of each of the steels (materials) to be joined, that is, portions within 2 mm from the joining surface 50 of the steels.

The present disclosure will hereinafter be described in more detail with reference to Examples and Comparative Examples. Note that the present disclosure is not limited by the following examples at all.

EXAMPLES (Examples (1 to 6) and Comparative Examples (1 and 2) of Steel Joined Body)

Example 1

In Example 1, prepared were two steels (low-carbon steels) having a cylindrical shape (length X: 150 mm, diameter $\phi$: 15 mm (diameter of joining surface)) as shown in FIG. 1 and having a carbon concentration of 0.045 mass %. These two steels were joined together to prepare a steel joined body or a test sample denoted by reference numeral 1 in FIG. 1. At this time, carbon powder (carbonaceous material) was disposed on the joining surface of each of the two steels, followed by overlapping the joining surfaces of the steels to be joined having the carbonaceous material interposed therebetween. Next, the test sample was subjected to high frequency induction heating at a maximum temperature of 1250° C. in the air, and then, slowly cooled. The mass of the carbon powder disposed on the joining surface of each of the two steels was adjusted to cause a reaction at a joint interface as shown in FIGS. 2 and 3. In addition, the carbon concentration in the joint interface after the high frequency induction heating was adjusted to 0.20 mass % by controlling a heating and holding time at the maximum temperature.

In Example 1, the following "Determination of Joint Strength and Wear Resistance" was performed on the prepared test sample (steel joined body). (Determination of Presence or Absence of Concentration Gradient Layer, Main Structure of Joint Interface, Joint Strength and Wear Resistance)

Figure 4A:
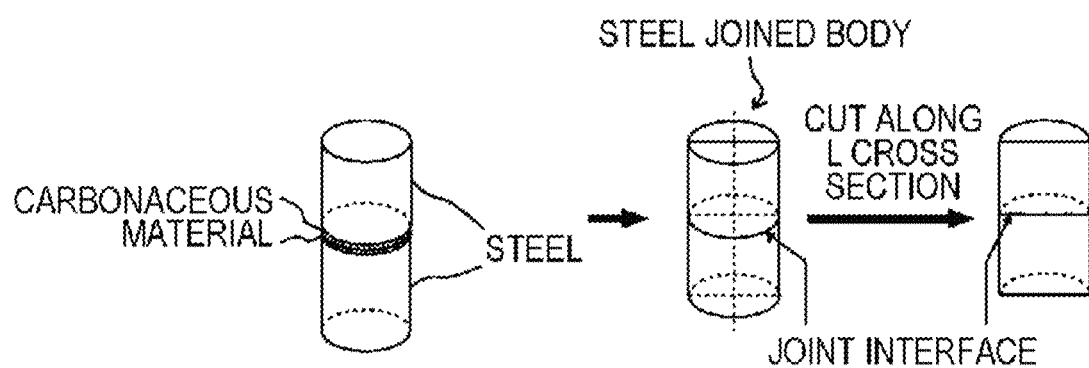
FIGS. 4A and 4B are conceptual diagrams for describing parts to observe metallographic structures of a steel joined body.
Figure 4B:
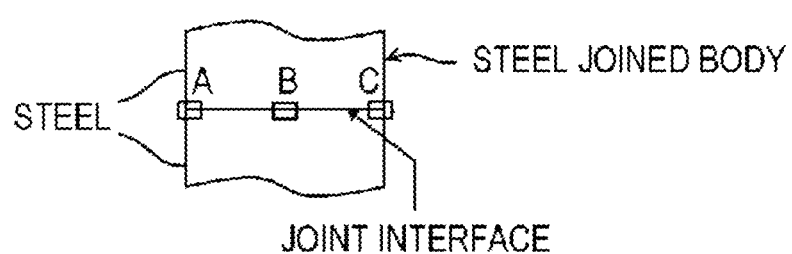

The prepared test sample (steel joined body) was observed to determine the presence or absence of a concentration gradient layer (a concentration gradient layer having a carbon concentration decreasing with distance from the joint interface), main structure of the joint interface, joint strength (High, Low), and wear resistance (High, Low). With regard to the presence or absence of a concentration gradient layer, a graph as shown in FIG. 1 was created, plotting a carbon concentration relative to the distance, thereby determining whether the carbon concentration was likely to decrease. The main structure (metallographic structure) of the joint interface was observed with an optical microscope while a predetermined part of the joint interface of the manufactured steel joined body was subjected to initial etching. FIGS. 4A and 4B are views for describing parts to observe metallographic structures. The steel joined body shown in FIG. 4B is obtained by cutting the steel joined body shown in FIG. 4A along L cross section. Images of parts A, B, and C on L cross section was captured and subjected to image processing to determine the presence or absence of a metallographic structure (such as pearlite). The joint strength was measured and evaluated as tensile strength. The tensile strength was tested using JIS9 A (G.L 100 mm). In addition, the wear resistance was evaluated from a specific wear amount of the outer periphery of a joint, using a wear tester with the speed and final load adjusted in a dry environment and using a grindstone including cubic silicon nitride (Particle Size #400) as a counter body. The following Table 1 shows results of the above items.

Example 2

In Example 2, prepared were two steels (medium-carbon steels) having a cylindrical shape (length X: 150 mm, diameter ϕ: 15 mm (diameter of joining surface)) as shown in FIG. 1 and having a carbon concentration of 0.450 mass %. The carbon concentration in a joint interface after high frequency induction heating was adjusted to 0.50 mass % by controlling a heating and holding time at the maximum temperature. Except for this condition, a test sample (steel joined body) was prepared under the conditions and method employed in Example 1.

In Example 2, similarly to Example 1, "Determination of Presence or Absence of Concentration Gradient Layer, Main Structure of Joint Interface, Joint Strength and Wear Resistance" was performed. In this determination, the conditions and method employed in Example 1 were used. For this reason, the conditions and method will not be described. The following Table 1 shows results of Example 2 together with the results of Example 1.

Example 3

In Example 3, prepared were two steels (medium-carbon steels) having a cylindrical shape (length X: 150 mm, diameter ϕ: 15 mm (diameter of joining surface)) as shown in FIG. 1 and having a carbon concentration of 0.450 mass %. The carbon concentration in a joint interface after high frequency induction heating was adjusted to 0.90 mass % by controlling a heating and holding time at the maximum temperature. Except for this condition, a test sample (steel joined body) was prepared under the conditions and method employed in Example 1.

In Example 3, similarly to Example 1, "Determination of Presence or Absence of Concentration Gradient Layer, Main Structure of Joint Interface, Joint Strength and Wear Resistance" was performed. In this determination, the conditions and method employed in Example 1 were used. For this reason, the conditions and method will not be described. The following Table 1 shows results of Example 3 together with the results of Example 1.

Figure 5:
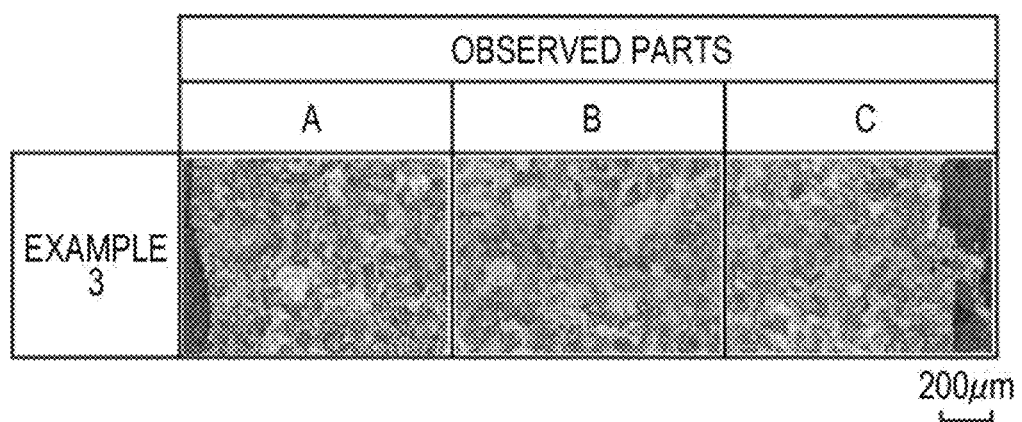
FIG. 5 shows images of metallographic structures of a test sample (steel joined body) prepared in Example 3 which are captured at parts A, B, and C on L cross section shown in FIG. 4B.

For reference purposes, FIG. 5 shows images of metallographic structures captured at parts A, B, and C on L cross section shown in FIG. 4B of the test sample (steel joined body) prepared in Example 3.

Example 4

In Example 4, prepared were two steels (medium-carbon steels) having a cylindrical shape (length X: 150 mm, diameter ϕ: 15 mm (diameter of joining surface)) as shown in FIG. 1 and having a carbon concentration of 0.450 mass %. The carbon concentration in a joint interface after high frequency induction heating was adjusted to 1.30 mass % by controlling a heating and holding time at the maximum temperature. Except for this condition, a test sample (steel joined body) was prepared under the conditions and method employed in Example 1.

In Example 4, similarly to Example 1, "Determination of Presence or Absence of Concentration Gradient Layer, Main Structure of Joint Interface, Joint Strength and Wear Resistance" was performed. In this determination, the conditions and method employed in Example 1 were used. For this reason, the conditions and method will not be described. The following Table 1 shows results of Example 4 together with the results of Example 1.

Example 5

In Example 5, prepared were two steels (medium-carbon steels) having a cylindrical shape (length X: 150 mm, diameter ϕ: 15 mm (diameter of joining surface)) as shown in FIG. 1 and having a carbon concentration of 0.450 mass %. The carbon concentration in a joint interface after high frequency induction heating was adjusted to 1.70 mass % by controlling a heating and holding time at the maximum temperature. Except for this condition, a test sample (steel joined body) was prepared under the conditions and method employed in Example 1.

In Example 5, similarly to Example 1, "Determination of Presence or Absence of Concentration Gradient Layer, Main Structure of Joint Interface, Joint Strength and Wear Resistance" was performed. In this determination, the conditions and method employed in Example 1 were used. For this reason, the conditions and method will not be described. The following Table 1 shows results of Example 5 together with the results of Example 1.

Example 6

In Example 6, prepared were two steels (medium-carbon steels) having a cylindrical shape (length X: 150 mm, diameter ϕ: 15 mm (diameter of joining surface)) as shown in FIG. 1 and having a carbon concentration of 0.450 mass %. The carbon concentration in a joint interface after high frequency induction heating was adjusted to 2.10 mass % by controlling a heating and holding time at the maximum temperature. Except for this condition, a test sample (steel joined body) was prepared under the conditions and method employed in Example 1.

In Example 6, similarly to Example 1, "Determination of Presence or Absence of Concentration Gradient Layer, Main Structure of Joint Interface, Joint Strength and Wear Resistance" was performed. In this determination, the conditions and method employed in Example 1 were used. For this reason, the conditions and method will not be described. The following Table 1 shows results of Example 6 together with the results of Example 1.

Comparative Examples

Comparative Example 1

In Comparative Example 1, prepared were two steels (low-carbon steels) having a cylindrical shape (length X: 150 mm, diameter ϕ: 15 mm (diameter of joining surface)) as shown in FIG. 1 and having a carbon concentration of 0.045 mass %. The carbon concentration in a joint interface after high frequency induction heating was adjusted to 0.10 mass % by controlling a heating and holding time at the maximum temperature. Except for this condition, a test sample (steel joined body) was prepared under the conditions and method employed in Example 1.

In Comparative Example 1, similarly to Example 1, "Determination of Presence or Absence of Concentration Gradient Layer, Main Structure of Joint Interface, Joint Strength and Wear Resistance" was performed. In this determination, the conditions and method employed in Example 1 were used. For this reason, the conditions and method will not be described. The following Table 1 shows results of Comparative Example 1 together with the results of Example 1.

Comparative Example 2

In Comparative Example 2, prepared were two steels (medium-carbon steels) having a cylindrical shape (length X: 150 mm, diameter ϕ: 15 mm (diameter of joining surface)) as shown in FIG. 1 and having a carbon concentration of 0.450 mass %. The carbon concentration in a joint interface after high frequency induction heating was adjusted to 2.30 mass % by controlling a heating and holding time at the maximum temperature. Except for this condition, a test sample (steel joined body) was prepared under the conditions and method employed in Example 1.

In Comparative Example 2, similarly to Example 1, "Determination of Presence or Absence of Concentration Gradient Layer, Main Structure of Joint Interface, Joint Strength and Wear Resistance" was performed. In this determination, the conditions and method employed in Example 1 were used. For this reason, the conditions and method will not be described. The following Table 1 shows results of Comparative Example 2 together with the results of Example 1.

the joint interface but cementite was not found. For this reason, in the steel joined bodies of Examples 1 to 3 in which hard and brittle cementite was not found (having the joint interface having a carbon concentration of 0.20 mass % or more and 0.90 mass % or less), it is considered that the joint strength and the wear resistance were further enhanced. In addition, from the observation results, when medium-carbon steels are used as steels to be joined, a joint interface having a carbon concentration of 0.50 mass % or more and 0.90 mass % or less provides an advantage to achievement of the object of the present disclosure.

(Examples (7 to 11) and Comparative Examples (3 and 4) of Method for Manufacturing Steel Joined Body)

Example 7

In Example 7, prepared were two S45C steels (medium-carbon steels) or round bars having a size of ϕ14.7 in joining surface diameter×47 mm in axial length L. Joining surfaces of the S45C steels were overlapped having a carbonaceous material (PGS graphite sheet available from Panasonic Corporation) (20 mm in length×20 mm in width×16 μm in thickness) interposed therebetween, thereby perform thermal joining. The mass (gram) of the graphite sheet was adjusted so that a carbon concentration reached a level at which a liquid phase L is generated on the joining surfaces of the steels at the following maximum temperature (1250° C.).

In addition, the following maximum temperature was measured by welding a platinum rhodium thermocouple to

TABLE 1

| | Comparative Example 1 | Example 1 | Example 2 | Example 3 | Example 4 | Example 5 | Example 6 | Comparative Example 2 |
|---|---|---|---|---|---|---|---|---|
| Carbon concentration in joint interface mass % | 0.10 | 0.20 | 0.50 | 0.90 | 1.30 | 1.70 | 2.10 | 2.30 |
| Carbon concentration in steel (material) | 0.045 | 0.045 | 0.450 | 0.450 | 0.450 | 0.450 | 0.450 | 0.450 |
| Concentration gradient layer | Presence | Presence | Presence | Presence | Presence | Presence | Presence | Presence |
| Main structure of joint interface | Ferrite/pearlite | Ferrite/pearlite | Ferrite/pearlite | Pearlite | Pearlite/cementite | Pearlite/cementite | Pearlite/cementite | Solidification structure |
| Joint strength | High | High | High | High | High | High | High | Low |
| Wear resistance | Low | High | High | High | High | High | High | High |

(Results and Discussion)

The results in Table 1 show that a test sample (steel joined body) including a joint interface having a carbon concentration of 0.20 mass % or more and 2.10 mass % or less (Examples 1 to 6) enhances in joint strength and wear resistance. On the other hand, the result of Comparative Example 1 shows that a joint interface having a low carbon concentration decreases in wear resistance. In addition, the result of Comparative Example 2 shows that crystallization of solidification structure of a joint interface causes reduction of the joint strength.

In addition to pearlite as the main structure of the joint interface, cementite (including cementite at austenite grain boundaries) was found in the steel joined bodies of Examples 4 to 6. With regard to the steel joined bodies of Examples 1 to 3, pearlite was found as the main structure of the outer periphery of each S45C steel, that is, portions within 2 mm from the joining surfaces of the steels.

In other words, as shown in the process flowchart of FIG. 6, the disposing (Step S100), the overlapping (Step S110), and the heating (Step S120) were performed in order.

More specifically, as shown in the process flowchart of FIG. 7, the cooling (Step S130) was sequentially performed after the heating (Step S120). In the overlapping, the steels to be joined were overlapped having the carbonaceous material interposed therebetween while the joining surfaces of the steels were pressed at a pressure of 7.0 MPa, that is, a pressing load was applied to the joining surfaces.

In the heating, these S45C steels were heated up to a maximum temperature of 1250° C. in 20 seconds by high frequency induction heating at a frequency of 10 kHz in the air, and this temperature was held for 20 seconds, and then, the steels were air-cooled to room temperature. In the heating in the air, thermal joining was performed while the joining surfaces of the S45C steels were pressurized at a pressure of 7.2 MPa (load for fixing a joint interface) having the carbonaceous material interposed therebetween.

More specifically, in the heating, these S45C steels were heated up to a maximum temperature of 1250° C. in 20 seconds by high frequency induction heating at a frequency of 10 kHz in the air, and this temperature was held for 20 seconds, and then, the steels were air-cooled to room temperature. In the heating in the air, thermal joining was performed while the joining surfaces of the S45C steels were pressed against each other at a pressure of 7.2 MPa (a load for fixing the joint interface) having the carbonaceous material interposed therebetween, that is, thermal joining was performed while a pressing load was applied. In the cooling, at least the joining surfaces of the heated steels were left to stand until cool.

In Example 7, a steel joined body obtained by these steps was used as a test sample.

Figure 12:
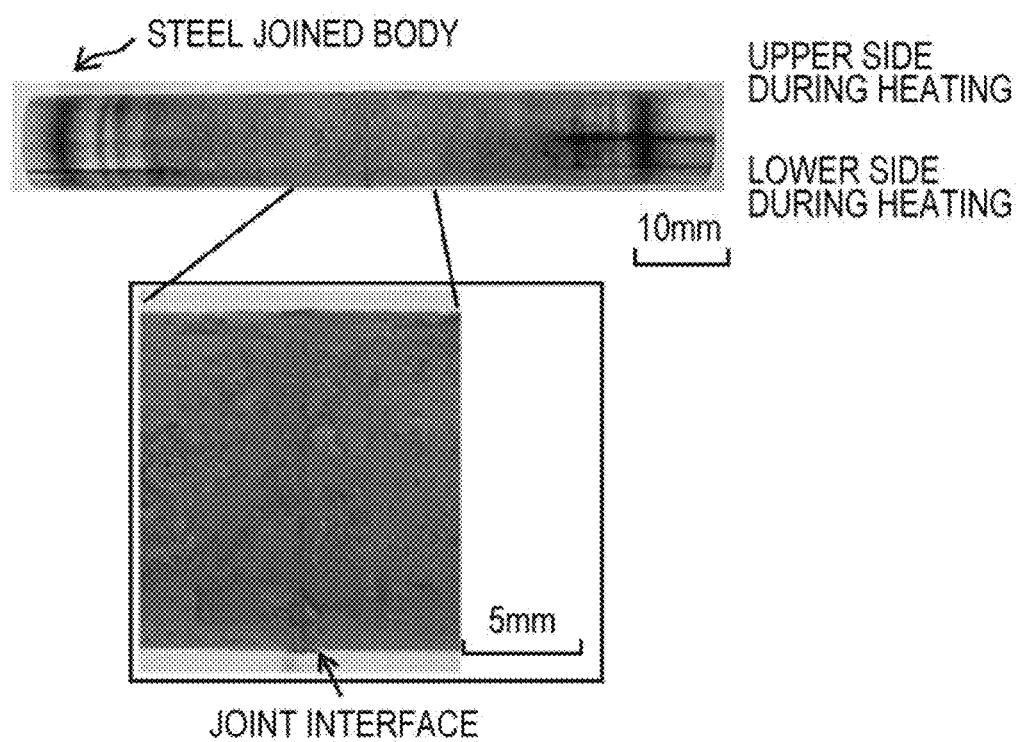
FIG. 12 is a photograph showing the exterior of a steel joined body obtained in Example 7.
Figure 13A:
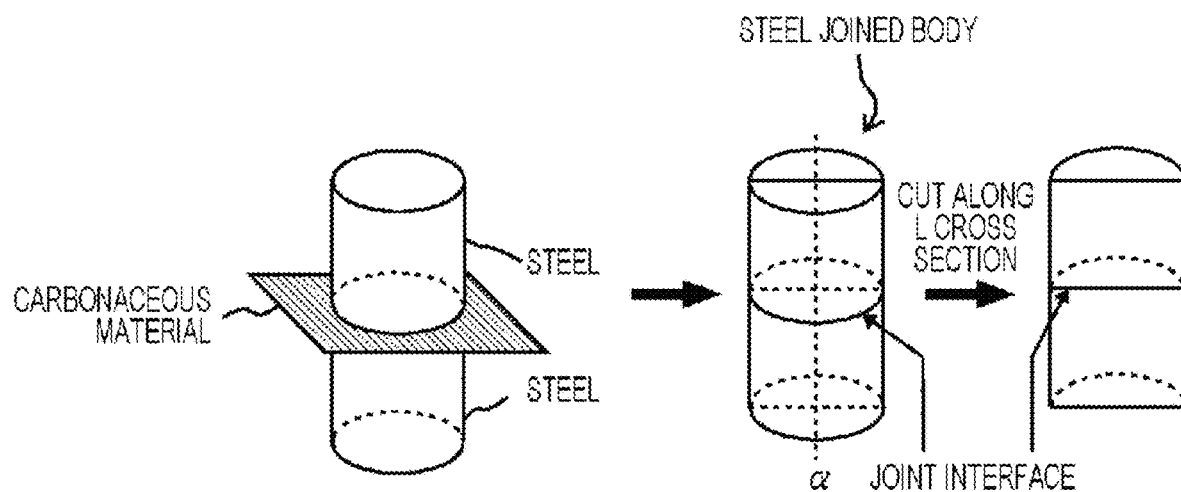
FIGS. 13A and 13B are views for describing a position to observe when determining a joint ratio and a method for calculating the joint ratio.
Figure 13B:
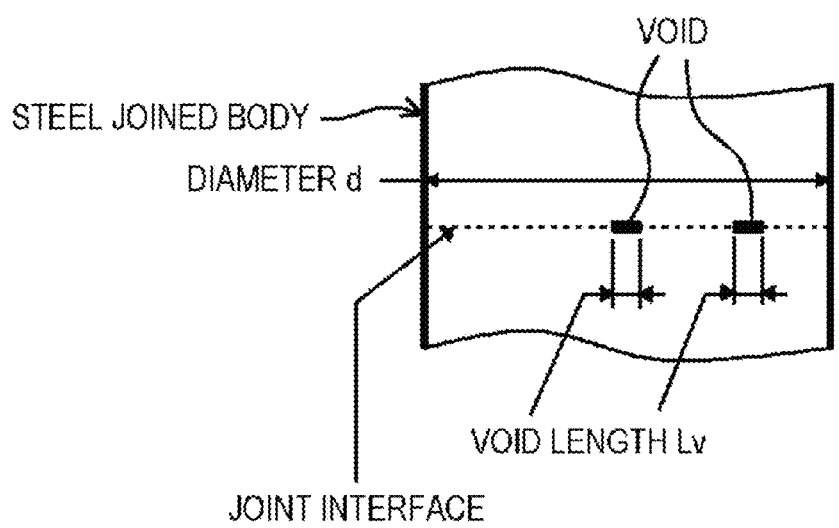

The exterior of the steel joined body obtained in Example 7 was observed with a camera. FIG. 12 is a photograph showing the exterior of the steel joined body obtained in Example 7. In addition, in Example 7, a joint ratio of the obtained steel joined body was determined. The joint ratio herein was determined using an optical microscope to observe the joint interface of the obtained steel joined body in a non-etched state. FIGS. 13A and 13B are views for describing a position to observe when determining a joint ratio and a method for calculating the joint ratio.

As shown in FIG. 13A, a position to observe for determining a joint ratio is on a cross section of the steel joined body cut along L cross section parallel to the central axis a as shown in FIG. 13A, and the joint ratio was obtained as a value calculated by "(d−ΣLv)/d×100" where d is a diameter of the steel joined body and Lv is a length of a void as shown in FIG. 13B. The following Table 2 shows the determined joint ratio together with another result.

Furthermore, in Example 7, a metallographic structure of the obtained steel joined body at the joint interface was observed. In observing the metallographic structure herein, a predetermined part at the joint interface of the surface of the thermally joined steel joined body cut along L cross section as shown in FIG. 13A was observed with a camera in a non-etched state. FIGS. 14A and 14B are views for describing parts to observe metallographic structures and photographs of the metallographic structures of the parts. The steel joined body shown in FIG. 14A is cut along the joint interface as shown in FIG. 13A. The metallographic structures at parts A, B, and C on the cross section of the joint interface were observed. FIG. 14B shows photographs of the metallographic structures of these parts A, B, and C together with other photographs of metallographic structures.

Example 8

In Example 8, similarly to Example 7, a steel joined body obtained was observed to determine the "joint ratio" and the "metallographic structure at the joint interface". In this determination, the method employed in Example 7 was used. For this reason, the method will not be described.

In Example 8, similarly to Example 7, as shown in the process flowchart of FIG. 6 (specifically, FIG. 7), the disposing (Step S100), the overlapping (Step S110), and the heating (Step S120) were performed in order. Example 8 was different from Example 7 in that the heating was performed in a nitrogen gas atmosphere. In the heating in the nitrogen gas atmosphere, the flow rate of the nitrogen gas was set to 100 L/min, and thermal joining was performed while joining surfaces of S45C steels were pressurized at a pressure of 7.2 MPa (load for fixing the joint interface) with a carbonaceous material interposed therebetween.

The following Table 2 shows the determined joint ratio together with the result of Example 7. FIGS. 14A and 14B show a view for describing parts to observe metallographic structures and photographs of the metallographic structures of the parts obtained in Example 7.

TABLE 2

| | Joint ratio (%) |
|---|---|
| Example 7 | 99.66 |
| Example 8 | 99.51 |

Results and Evaluation

FIG. 12 shows round bars being joined to each other in the steel joined body obtained in Example 7. In addition, Table 2 shows that no significant difference was found in joint ratio between the steel joined body of Example 7 and that of Example 8.

Furthermore, FIGS. 14A and 14B show that there was no significant difference in metallographic structure between the joint interface of the steel joined body of Example 7 and that of Example 8 and that a pearlite phase was formed in both cases.

Examples 9 to 11

Thermal joining was performed by steps and conditions similar to those employed in Example 8 except that the maximum temperature was changed to 1150° C. (Example 9), 1200° C. (Example 10), and 1300° C. (Example 11). Steel joined bodies obtained by the thermal joining were used as test samples at each maximum temperature. Similarly to Example 7, each of the obtained steel joined bodies was observed to determine the "joint ratio" and the "metallographic structure at the joint interface". In this determination, the method employed in Example 7 was used. For this reason, the method will not be described.

Figures 15A, 15B:
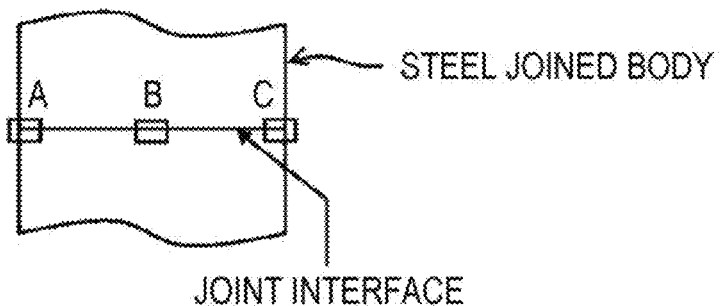
FIGS. 15A and 15B show a view for describing parts to observe metallographic structures of steel joined bodies obtained in Example 9 to Example 11 and photographs of the metallographic structures of the parts.

The following Table 3 shows results of the joint ratio determined in Example 9 to Example 11. FIGS. 15A and 15B show a view for describing parts to observe metallographic structures and photographs of the metallographic structures of the parts obtained in Example 9 to Example 11.

TABLE 3

| | Joint ratio (%) |
|---|---|
| Example 9 | 99.23 |
| Example 10 | 99.49 |
| Example 11 | 99.60 |

Results and Evaluation

Table 3 shows that no significant difference was found in joint ratio among the steel joined bodies of Examples 9 to 11. Furthermore, no significant difference was found between Examples 9 to 11 and Examples 7 and 8. In addition, from FIG. 15B, no significant difference was found in metallographic structure of the joint interface among the steel joined bodies of Examples 9 to 11, and no significant difference was found between the steel joined bodies of Examples 9 to 11 and Examples 7 and 8, and a pearlite phase was found in all those Examples.

Comparative Example 3

In Comparative Example 3, thermal joining was performed by steps and conditions similar to those employed in Example 8 except that the maximum temperature was set to 1100° C. As a result of the test, joining as shown in Examples 7 to 11 was not observed, indicating that the joint ratio was 0%.

Comparative Example 4

Thermal joining was performed by steps and conditions similar to those employed in Example 8 except that the graphite sheet used in Example 7 was not used.

As a result of the test, joining as shown in Examples 7 to 11 was not observed, indicating that the joint ratio was 0%.

These results show that the method for manufacturing a steel joined body according to an embodiment of the invention efficiently enhances the joint strength between steels by setting the maximum temperature to, preferably, 1150° C. or higher and 1300° C. or lower.

INDUSTRIAL APPLICABILITY

A method for manufacturing a steel joined body according to an embodiment of the invention efficiently enhances the joint strength between steels. Specifically, the method for manufacturing a steel joined body according to an embodiment of the invention enhances the joint strength between steels easily and efficiently.

Accordingly, the method for manufacturing a steel joined body according to an embodiment of the invention is suitably employed for manufacturing various structures including a steel joined body.

REFERENCE SIGNS LIST 1, 1A Steel joined body
10 Steel (material)
10a Joining surface
15 Concentration gradient layer
20 Steel
20a Joining surface
25 Concentration gradient layer
30 Carbonaceous material
30a Joint interface
31 Joint
40 Carbonaceous material
50 Joint interface
100 High frequency induction heating
S100 Disposing
S110 Overlapping
S120 Heating
A Carbon concentration (joint interface)
B Carbon concentration (side opposite to joint interface of concentration gradient layer)
X Length (steel)
φ Diameter (steel)
γ Austenite phase
L Liquid phase

What is claimed is:

1. A method for manufacturing a steel joined body having a plurality of steels joined together, the method comprising:
disposing a carbonaceous material on at least one joining surface of steels to be joined together;
overlapping joining surfaces of the steels to be joined together having the carbonaceous material interposed between the joining surfaces; and
heating the steels having the joining surfaces overlapped at a maximum temperature of 1150° C. or higher and 1500° C. or lower,
the carbonaceous material being disposed to generate a liquid phase on the joining surfaces at the maximum temperature,
the carbon concentration in a joint interface after high frequency induction heating was adjusted to 0.20 mass % or higher and 2.10 mass % or lower by controlling a heating and holding time at the maximum temperature.

2. The method for manufacturing a steel joined body according to claim 1, wherein the maximum temperature is 1150° C. or higher and 1300° C. or lower.

* * * * *